(12) United States Patent
Wagner et al.

(10) Patent No.: US 9,917,466 B2
(45) Date of Patent: Mar. 13, 2018

(54) DC POWER SOURCE AND ASSOCIATED METHODS OF OPERATING SAME TO EFFICIENTLY SUPPLY A SPECIFICATION-COMPLIANT OUTPUT VOLTAGE

(71) Applicant: GOOGLE TECHNOLOGY HOLDINGS LLC, Mountain View, CA (US)

(72) Inventors: Daniel H. Wagner, Grayslake, IL (US); Roshan Kamath, Hainesville, IL (US); Daniel C. Nowak, Chicago, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 987 days.

(21) Appl. No.: 14/230,421

(22) Filed: Mar. 31, 2014

(65) Prior Publication Data
US 2015/0188325 A1    Jul. 2, 2015

Related U.S. Application Data

(60) Provisional application No. 61/921,561, filed on Dec. 30, 2013.

(51) Int. Cl.
*H02J 3/14* (2006.01)
*H02J 7/00* (2006.01)
*H02J 7/04* (2006.01)
*H02M 3/00* (2006.01)
*H02M 5/45* (2006.01)

(52) U.S. Cl.
CPC ............ *H02J 7/0085* (2013.01); *H02J 7/007* (2013.01); *H02J 7/0022* (2013.01); *H02J 7/0068* (2013.01); *H02J 7/045* (2013.01); *H02M 3/00* (2013.01); *H02M 5/45* (2013.01); *H02J 7/0029* (2013.01); *H02J 7/0036* (2013.01); *Y10T 307/406* (2015.04)

(58) Field of Classification Search
CPC .......... H02M 5/45; H02M 3/00; H02J 7/0029; H02J 7/007; H02J 7/0068; H02J 7/0022; H02J 7/045; B60R 16/033; B60L 11/1846; B60L 11/1868; B60L 11/1861
USPC ............ 307/10.19, 10.6, 31; 363/37, 34, 45; 320/120, 128, 162, 164, 134; 701/113
See application file for complete search history.

(56) References Cited

U.S. PATENT DOCUMENTS 5,729,061 A * 3/1998 Narita ...................... H02H 7/18
                                                    307/116

* cited by examiner

*Primary Examiner* — Arnold Kinkead
(74) *Attorney, Agent, or Firm* — Van Court & Aldridge LLP

(57) ABSTRACT

A direct current (DC) power source includes a rechargeable battery and a battery charging circuit, and supplies an output voltage within a specified output voltage range to at least one output port. In one embodiment, the power source determines whether an input voltage is present at an input port, where the input voltage is usable to produce a battery charging voltage during normal operation of the charging circuit. The power source also determines whether at least one load device is coupled to the output port(s). When the input voltage is present at the input port and at least one load device is coupled to the output port(s), the power source electronically decouples the rechargeable battery from the charging circuit, electronically adjusts a voltage at an output of the charging circuit so as to be within the specified output voltage range, and provides the adjusted voltage to the output port(s).

21 Claims, 10 Drawing Sheets

DC POWER SOURCE AND ASSOCIATED METHODS OF OPERATING SAME TO EFFICIENTLY SUPPLY A SPECIFICATION-COMPLIANT OUTPUT VOLTAGE

TECHNICAL FIELD

The present disclosure relates generally to direct current (DC) power sources and, more particularly, to a DC power source and associated methods of operating same to efficiently provide a specification-compliant output voltage to one or more output ports, such as during a bypass or pass-through mode of operation.

BACKGROUND

A variety of direct current (DC) portable power sources exist to facilitate recharging of portable electronic devices when conventional alternating current (AC) power outlets are unavailable. Such power sources are typically charged from a conventional wall outlet charger, such as a Universal Serial Bus (USB) charger, and then carried by the user (e.g., in a purse, bag, backpack, briefcase, or even a pants or coat pocket) to provide backup charging power for portable electronic devices, such as smartphones, tablet computers, laptop computers, portable gaming systems, or other portable electronic devices.

An electrical block diagram of one conventional portable DC power source 100 (e.g., a portable battery pack) is illustrated in FIG. 1. As illustrated, the DC power source 100 includes, among other things, an input port 101, a battery charging circuit 103, a rechargeable battery 105, a controller 107, one or more discharge circuits 109-110 (two shown for illustration), and one or more output ports 112-113 (two also shown for illustration). The battery charging circuit 103 typically includes battery protection circuitry, including over-voltage protection, over-current protection, and under-voltage protection. The rechargeable battery 105 may include one or more battery cells, such as lithium-ion or lithium-polymer cells, and each discharge circuit 109-110 may convert (step-up or step-down, as appropriate) an output voltage of the battery 105 (e.g., Vbatt) to produce a desired output voltage (Vout) at the associated output port 112-113.

Each discharge circuit 109-110 is typically required to compensate for the difference between the battery voltage and a respective output voltage, which may need to comply with an industry specification, as well as to flatten or linearize the typically non-linear discharge curve of the battery 105. In most situations, the discharge circuit 109-110 is required to increase or boost (step-up) the battery voltage to a desired output voltage level. For example, to comply with the USB specification, the discharge circuit 109-110 may step the battery voltage up from a cell voltage of 2.7-4.4 Volts (V), depending upon the chemistry of the battery cells, to 4.75-5.55 V to produce a USB-compliant output voltage at an output port 112-113, depending on the version of the USB specification (4.75-5.25 V for pre-3.0 specification and 5.0-5.55 V for the USB 3.0 specification).

During operation, the controller 107 senses the battery voltage, the input port 101, and the output port or ports 112-113 (sensing and control lines are shown in dashed form in FIG. 1). When the controller 107 determines that an input voltage (Vin) is present at the input port and the battery voltage is below a threshold (e.g., a top-off threshold), the controller 107 activates the battery charging circuit 103 to enable the battery 103 to receive charging current and a battery charging voltage from an external source applied to the input port 101. When the controller 107 also detects the presence of a load device connected to an output port 112-113 of the power source 100, the controller 107 determines whether the battery 103 is in a state of charge sufficient to supply power to the output port 112-113 to which the load device is connected. For example, the controller 107 may determine whether the battery voltage is greater than a minimum threshold. If the battery 103 is sufficiently charged, the controller 107 may enable the appropriate discharge circuit 109 to convert (e.g., boost (step-up) or buck (step-down), as appropriate) the battery voltage to the appropriate output voltage for the output port 112-113 to which the load device is connected. Therefore, the power source 100 of FIG. 1 provides output power to the output ports 112-113 only after the battery 105 has been charged to a minimum voltage level. The voltage applied to the input port 101 may typically be about 4.0-5.25 V, where the input voltage is received from a conventional USB charger. Additionally, the battery voltage may be 2.7-4.4 V, depending on the battery chemistry. Further, as noted above, the output voltage applied to the output port 112-113 may be about 4.75-5.55 V where the output port 112-113 is USB-compliant. Therefore, according to the configuration of the power source 100 of FIG. 1, the input voltage is dropped down to the battery voltage via linear or switchmode means, and then the battery voltage is boosted or stepped back up to the output voltage. However, such a process can be rather inefficient, resulting in an undesirable loss of energy in the charging circuit 103 and the discharging circuit 109-110 during periods of simultaneous drop-down and boosting functions.

To mitigate such a loss of power, some portable power sources include a bypass circuit to supply power from the input port to an output port when a load device is connected to the output port. A portable power source 200 incorporating such a bypass circuit is illustrated in electrical block diagram form in FIG. 2. As illustrated in the figure, the power source 200 is similar to the power source 100 of FIG. 1 in that the power source 200 includes, among other things, an input port 201, a battery charging circuit 203, a rechargeable battery 205, a controller 207, one or more discharge circuits 209 (one shown for illustration), and one or more output ports 211-212 (two also shown for illustration). The controller 207 monitors the input port 201, the output port or ports 211-212, and the battery voltage or other state-of-charge parameter (sensing and control lines are shown in dashed form in FIG. 2). The controller 207 also controls the activation and deactivation of the battery charging circuit 203 and the discharge circuit 209. Additionally, in contrast to the power source 100 of FIG. 1, the power source 200 of FIG. 2 includes a bypass circuit 214 that, when enabled by the controller 207, supplies the input voltage (Vin) received at the input port 201 to the output port or ports 211-212. The bypass circuit 214 may be implemented using a pair of series-connected, anti-parallel metal-oxide-semiconductor field-effect transistor (MOSFETs) controlled by the controller 207.

As discussed above with respect to FIG. 1, the input voltage may typically be about 4.0-5.25 V, where the external power source applied to the input port 201 is a USB outlet charger. Thus, the input voltage may droop below 4.75 V at times, as is well understood in the art. If the input voltage droops, the voltage at the output port 211-212 (Vout) would be less than 4.75 V, taking into account even the minor voltage drop across the bypass circuit 214. In such a case, the power source's output voltage would not be compliant with the USB specification, which requires an output voltage of 4.75-5.55 V depending on the version of the specification.

Figure 1:
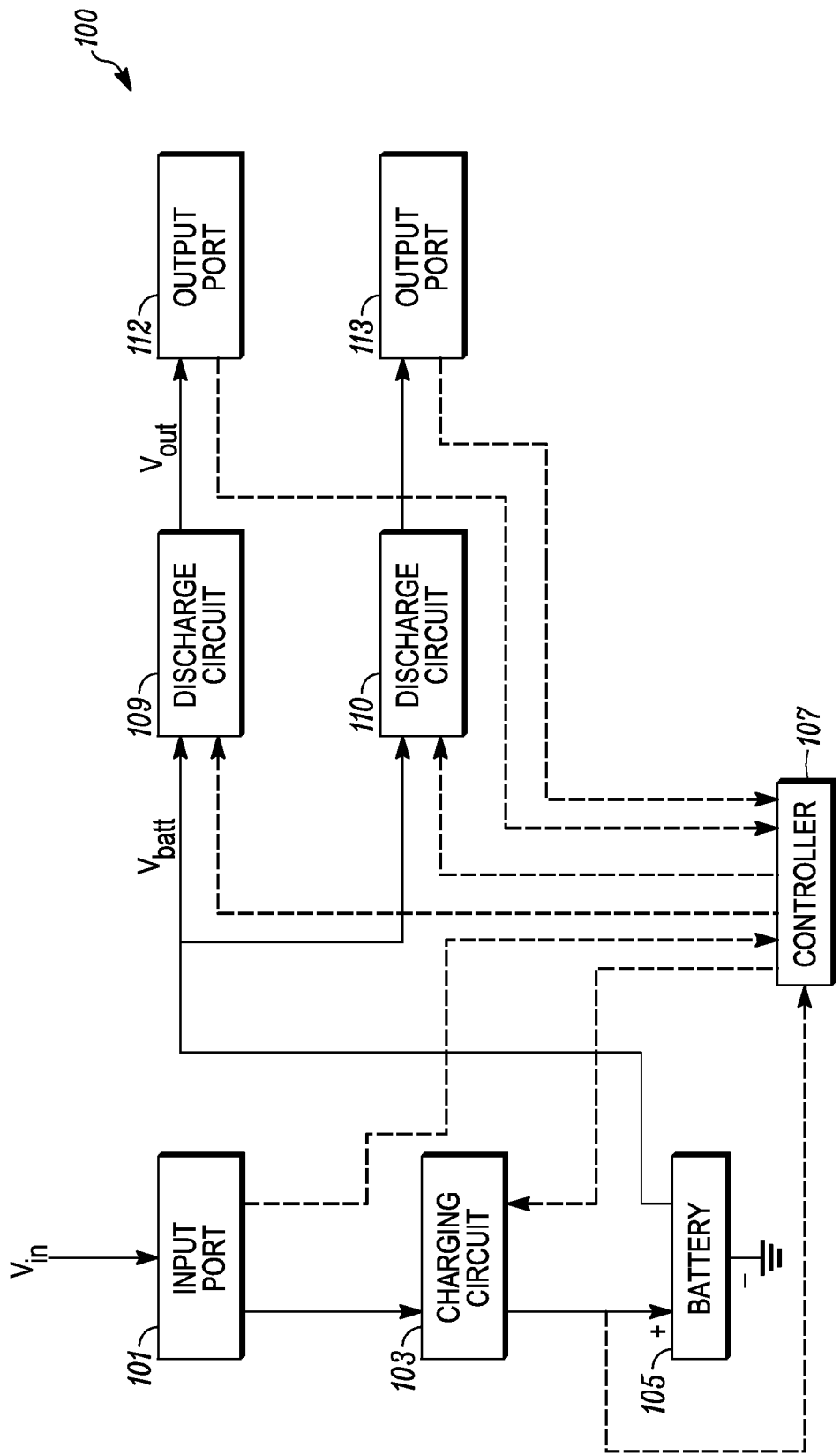
FIG. 1 illustrates an electrical block diagram of a conventional portable DC power source that does not provide input voltage bypass to one or more output ports of the power source.
Figure 2:
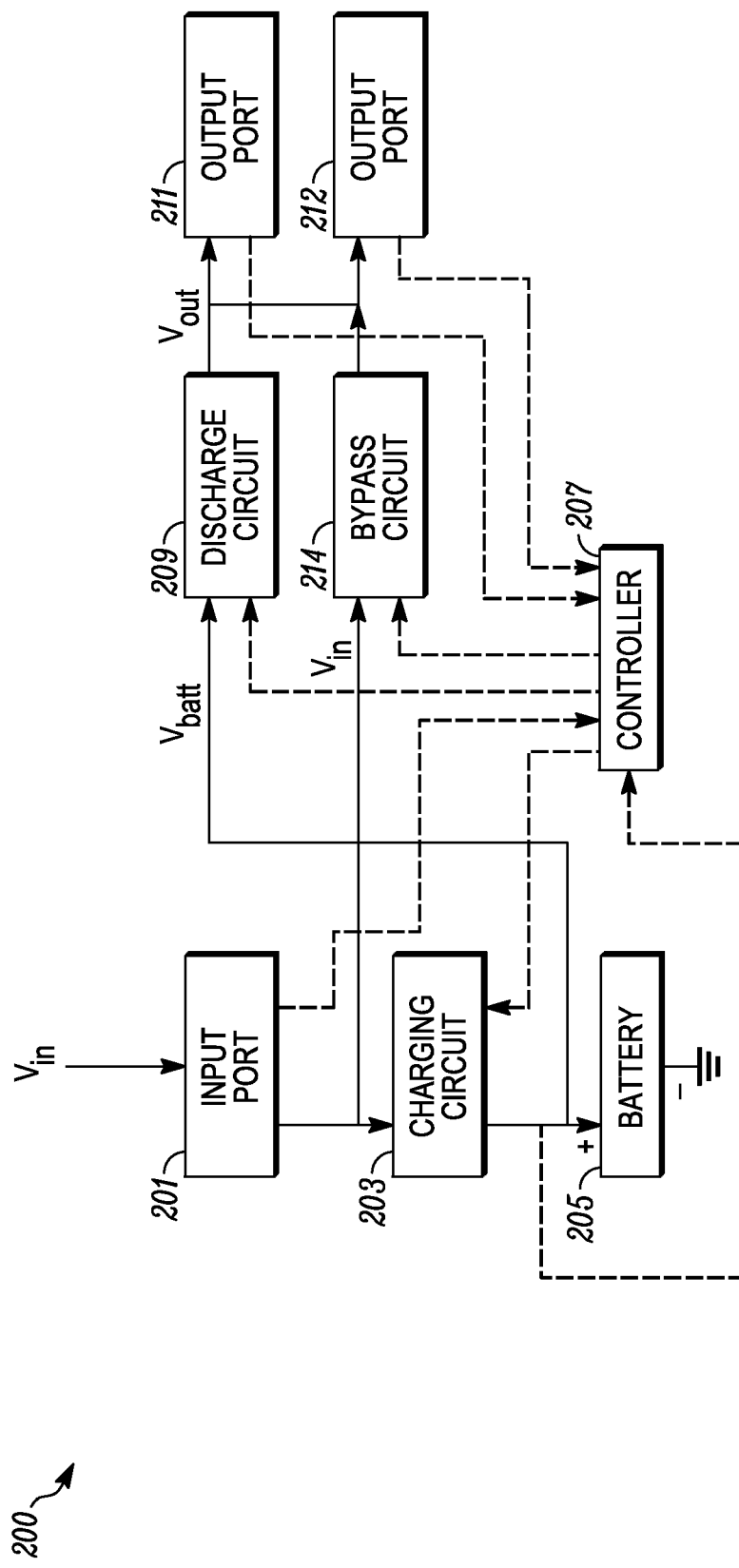
FIG. 2 illustrates an electrical block diagram of a conventional portable DC power source that provides input voltage bypass to one or more output ports of the power source.

Skilled artisans will appreciate that elements in the figures are illustrated for simplicity and clarity and have not necessarily been drawn to scale. For example, the dimensions of some of the elements in the figures may be exaggerated alone or relative to other elements or the elements may be shown in block diagram form to help improve the understanding of the various exemplary embodiments described herein.

DETAILED DESCRIPTION

Generally, the present disclosure relates to a DC power source and associated methods of operation to enable the DC power source to supply a DC output voltage within a specified output voltage range to at least one output port. According to one embodiment, the power source includes a single cell or a multiple cell rechargeable battery and a battery charging circuit. The power source determines whether an input voltage is present at its input port, wherein the input voltage is usable to produce a battery charging voltage during normal operation of the battery charging circuit. The power source also determines whether at least one load device is coupled to (and optionally seeking to draw current from) at least one output port of the power source. When the power source determines that both conditions are met (input voltage present at an input port and load device coupled to an output port), the power source electronically disconnects or otherwise decouples the battery from the battery charging circuit, electronically adjusts (e.g., converts) a voltage at an output of the battery charging circuit so as to be within the specified output voltage range, and provides the adjusted voltage to the output port(s) to which the load device(s) is coupled. For example, when the voltage at the output of the battery charging circuit is less than the specified output voltage range, the power source may electronically boost the battery charging voltage to be within the specified output voltage range. Alternatively, when the voltage at the output of the battery charging circuit is greater than the specified output voltage range, the power source may electronically step the battery charging voltage down to be within the specified output voltage range. The specified output voltage range may be based on an industry specification, such as the USB specification, or may be defined by a manufacturer of the DC power source. Additionally or alternatively, the power source may electronically decouple the battery from the battery charging circuit and otherwise perform the functions of the foregoing process when not only is an input voltage present at the input port and a load device coupled to an output port, but also the battery is either fully charged or fully discharged. By decoupling the battery from the battery charging circuit under certain conditions, the foregoing method enables energy to be provided from the input port to the output port(s) faster and more efficiently than if the battery remained in-circuit.

The battery may be electronically decoupled from the battery charging circuit by electronically disconnecting or otherwise decoupling a negative terminal of the battery from a ground potential, such as by electronically opening a switch positioned between the battery's negative terminal and the ground potential. Such a low-side decoupling switch is frequently present in conventional portable DC power sources, as part of standard over-current/under-voltage safety lock-out circuitry. However, in a conventional DC power source, activation of the low-side decoupling switch typically serves to shut down the power source by disconnecting the negative terminal of the battery in response to a detected over-current and/or under-voltage condition pertaining to the battery itself. Therefore, heretofore such switches have never been used to bypass the battery for purposes of delivering power to an output port of the power source. Alternatively, the battery may be electronically decoupled from the battery charging circuit by electronically disconnecting or otherwise decoupling a positive terminal of the battery from the output of the battery charging circuit, such as by electronically opening a switch positioned between the battery's positive terminal and the battery charging circuit.

According to an alternative embodiment, the DC power source may further determine whether the battery is in a fully charged state. When the power source determines that the battery is in a fully charged state, an input voltage is not present at the power source's input port, and at least one load device is coupled to at least one output port of the power source, the power source may electronically adjust an output voltage of the battery so as to be within the specified output voltage range and provide the adjusted battery voltage to the output port(s) to which the load device(s) is coupled. For example, when the battery's output voltage is less than the specified voltage range, the power source may electronically boost the battery's output voltage to be within the specified output voltage range. The power source may determine whether the battery is in a fully charged state by determining whether an output voltage of the battery is greater than a threshold, such as a top-off threshold.

According to a further embodiment, the DC power source may alternatively determine whether the battery is in a discharged state. When the power source determines that the battery is in a discharged state, an input voltage is present at the power source's input port, and there is no load device coupled to an output port of the power source, the power source may electronically re-couple the battery to the battery charging circuit for purposes of recharging the battery. The power source may determine whether the battery is in a discharged state by determining whether an output voltage of the battery is less than a minimum voltage threshold.

According to yet another embodiment, a DC power source may include a single cell or a multiple cell rechargeable battery and a battery charging circuit. In this embodiment, the power source may determine (a) whether an input voltage is present at an input port of the power source, (b) whether at least one load device is coupled to at least one output port of the power source, and (c) whether the rechargeable battery is in a fully charged state. When the DC power source determines that all three conditions are met, the power source may electronically decouple the battery from the battery charging circuit, electronically adjust a voltage at an output of the battery charging circuit so as to be within a specified output voltage range (which may comply with an industry standard), and provide the adjusted voltage to the output port(s) to which the load device(s) is coupled. After the battery has been decoupled from the battery charging circuit, the output of the battery charging circuit may be set to the highest valid battery charging voltage, or to a higher voltage, up to the voltage present at the input port of the power source. Such adjustment of the output voltage of the battery charging circuit may result in less voltage adjustment being required to achieve an output voltage within the specified voltage range. Thus, the power source may supply specification-compliant output power at greater efficiency and/or at a higher rate.

According to a still further embodiment, a DC power source may include a battery charging circuit coupled to a single cell or a multiple cell rechargeable battery. In this embodiment, the power source may determine (a) whether an input voltage is present at an input port of the power source, (b) whether at least one load device is coupled to at least one output port of the power source, and (c) whether the battery is in a fully discharged state. When the DC power source determines that all three conditions are met, the power source may electronically decouple the battery from the battery charging circuit, electronically adjust a voltage at an output of the battery charging circuit so as to be within a specified output voltage range (which may comply with an industry standard), and provide the adjusted voltage to the output port(s) to which the load device(s) is coupled. Where appropriate (e.g., where the voltage required at the output port or ports is greater than the voltage at the output of the battery charging circuit and/or at the input port) and after the battery has been decoupled from the battery charging circuit, the output of the battery charging circuit may be set to the highest valid battery charging voltage, which may be as high as the voltage present at the input port of the power source, to minimize required adjustment of the battery charging circuit's output voltage and improve efficiency.

According to yet another embodiment, a DC power source includes an input port, a battery charging circuit coupled to the input port, a rechargeable battery, a switching circuit, a voltage adjustment circuit coupled to an output of the battery charging circuit, at least one output port coupled to an output of the voltage adjustment circuit, and a controller operably coupled to the input port, the switching circuit, and the output port(s). The input port is operable to receive an input voltage. The battery charging circuit is operable during its normal operation to output a battery charging voltage based on the input voltage, which, when necessary, may be as high as the input voltage received at the input port. The switching circuit is configured to selectively couple and decouple the battery and an output of the battery charging circuit responsive to control signals. The voltage adjustment circuit is operable to adjust a voltage at the output of the battery charging circuit or an output voltage of the battery so as to be within a specified output voltage range (which may comply with an industry standard). Each output port enables a load device to be coupled to (and optionally seek to draw current from) the DC power source. The controller is operable to generate the control signals for selectively coupling and decoupling the battery and the output of the battery charging circuit. More particularly, according to this embodiment, the controller generates and supplies a control signal to the switching circuit for decoupling the battery from the output of the battery charging circuit responsive to determining that the input voltage is present at the input port and at least one load device is coupled to the output port(s). According to one exemplary configuration of this embodiment, the switching circuit is positioned between a negative terminal of the battery and a ground potential. Alternatively, the switching circuit may be positioned between a positive terminal of the battery and the output of the battery charging circuit.

According to a further embodiment, the DC power source may also include a bypass circuit, such as, for example, an electronic switch, connected between the DC power source's input port and the output of the battery charging circuit. The bypass circuit may be operable to selectively couple and decouple the input port and the output of the battery charging circuit responsive to bypass control signals generated by the controller. In other words, the bypass circuit is operable, when activated by the controller, to bypass the battery charging circuit. In this case, the controller may generate a bypass control signal causing the bypass circuit to couple the input port to the output of the battery charging circuit after the controller generates the control signal for decoupling the battery from the output of the battery charging circuit. The voltage adjustment circuit may then be operable to adjust an output voltage of the bypass circuit so as to be within the specified output voltage range.

According to a still further embodiment, the battery charging circuit may provide a secondary output that is over-voltage protected to be no greater than a first maximum voltage, which is less than a second maximum voltage that can be applied to the input port. In this case, the DC power source may further include a bypass circuit connected between the primary and secondary outputs of the battery charging circuit. The bypass circuit may be operable to selectively couple and decouple the primary output of the battery charging circuit and the secondary output of the battery charging circuit responsive to bypass control signals generated by the controller. In this case, the controller may generate a bypass control signal causing the bypass circuit to couple the primary output of the battery charging circuit to the secondary output of the battery charging circuit after the controller generates the control signal for decoupling the battery from the battery charging circuit. The voltage adjustment circuit may then be operable to adjust an output voltage of the bypass circuit so as to be within the specified output voltage range. This embodiment would allow the bypass circuit to have lower voltage requirements, and likely be less expensive, than the embodiment in which the bypass circuit selectively bypasses the entire battery charging circuit.

According to another embodiment that does not necessarily include a bypass circuit, the controller may be coupled to the battery and further operable to determine a state of charge for the battery. Responsive to determining that the battery is in a fully charged state, and that an input voltage is not present at the power source's input port and at least one load device is coupled to at least one of the power source's output ports, the controller may generate a control signal for coupling the battery to the output of the battery charging circuit. In other words, the controller may electronically reconfigure the power source so as to supply voltage from the charged battery to the voltage adjustment circuit in order to source power to the attached load device (s) when no input voltage is present at the power source's input port.

According to yet another embodiment that does not necessarily include a bypass circuit, the controller may be coupled to the battery and further operable to determine a state of charge for the battery. Responsive to determining that the battery is in a discharged state, and that an input voltage is present at the power source's input port and at least one load device is not coupled to at least one of the power source's output ports, the controller may generate a control signal for coupling the battery to the output of the battery charging circuit. In other words, the controller may electronically reconfigure the power source so as to supply power from the charging circuit to the discharged battery when power does not need to be supplied to a load device.

According to yet another embodiment, a DC power source includes an input port, a battery charging circuit coupled to the input port, a bypass circuit connected between the input port and an output of the battery charging circuit, a rechargeable battery, a switching circuit, a voltage adjustment circuit coupled to the output of the battery charging circuit, at least one output port coupled to an output of the voltage adjustment circuit, and a controller operably coupled to the input port, the switching circuit, the bypass circuit, the battery charging circuit, and the output port(s). The input port is operable to receive an input voltage. The battery charging circuit is operable during normal operation to output a battery charging voltage based on the input voltage, which, when necessary, may be as high as the input voltage received at the input port. The bypass circuit is operable to selectively couple and decouple the input port and the output of the battery charging circuit responsive to bypass control signals. The switching circuit is configured to selectively couple and decouple the battery and an output of the battery charging circuit responsive to switching control signals. The voltage adjustment circuit is operable to adjust the battery charging voltage, an output voltage of the battery, or an output voltage of the bypass circuit so as to be within a specified output voltage range (which may comply with an industry standard). Each output port enables a load device to be coupled to (and optionally draw current from) the DC power source. The controller is operable to generate the bypass control signals and the switching control signals. More particularly, according to this embodiment, the controller generates a switching control signal for decoupling the battery from the output of the battery charging circuit responsive to determining that the input voltage is present at the input port and at least one load device is coupled to the output port(s). After generating the switching control signal, the controller generates a bypass control signal to activate the bypass circuit and cause the bypass circuit to couple the input port to the output of the battery charging circuit, which shares a common node with an input of the voltage adjustment circuit. The controller may be further optionally operable to generate a battery charging control signal to deactivate the battery charging circuit when the bypass circuit is to be or has been activated.

According to yet a further embodiment, a DC power source includes an input port, a battery charging circuit coupled to the input port and including primary and secondary outputs, a bypass circuit connected between the primary and secondary outputs of the battery charging circuit, a rechargeable battery, a switching circuit, a voltage adjustment circuit coupled to the output of the battery charging circuit, at least one output port coupled to an output of the voltage adjustment circuit, and a controller operably coupled to the input port, the switching circuit, the bypass circuit, the battery charging circuit, and the output port(s). The input port is operable to receive an input voltage. The battery charging circuit is operable during normal operation to produce, at its primary output, a battery charging voltage and to produce, at its secondary output, an intermediate voltage that is over-voltage protected to be no greater than a first maximum voltage, wherein the first maximum voltage is less than a second maximum voltage that can be applied to the input port. The bypass circuit is operable to selectively couple and decouple the primary output of the battery charging circuit and the secondary output of the battery charging circuit responsive to bypass control signals. The switching circuit is configured to selectively couple and decouple the battery and an output of the battery charging circuit responsive to switching control signals. The voltage adjustment circuit is operable to adjust the battery charging voltage, an output voltage of the battery, or an output voltage of the bypass circuit so as to be within a specified output voltage range (which may comply with an industry standard). Each output port enables a load device to be coupled to (and optionally seek to draw current from) the DC power source. The controller is operable to generate the bypass control signals and the switching control signals. More particularly, according to this embodiment, the controller generates a switching control signal for decoupling the battery from the primary output of the battery charging circuit responsive to determining that the input voltage is present at the input port and at least one load device is coupled to the output port(s). After generating the switching control signal, the controller generates a bypass control signal to activate the bypass circuit and cause the bypass circuit to couple the secondary output of the battery charging circuit to an input of the voltage adjustment circuit, which shares a common node with the output of the battery charging circuit. The controller may be further optionally operable to generate a battery charging control signal to deactivate the battery charging circuit when the bypass circuit is to be or has been activated.

By configuring and operating a DC power source to decouple or float its rechargeable battery when the power source is receiving an input voltage from an external source, such as a wall charger, and needs to supply a specification-compliant output voltage to a connected load device, the power source operates more efficiently than prior art portable power sources which drop the input voltage down to the battery voltage and then boost the battery voltage to an output voltage that is specification-compliant. When the battery is decoupled or floated, the battery does not load the battery charging circuit, thereby enabling a voltage at the output of the battery charging circuit to be only lightly adjusted (e.g., boosted) in order to maintain a specification-compliant output voltage. Absent such light adjustment, the power source's output voltage could fall out of specification compliance under input voltage droop conditions.

Exemplary embodiments of the disclosed DC power source and various operational methods can be more readily understood with reference to FIGS. 3-7D, in which like reference numerals designate like items. In FIGS. 3-6, exemplary sensing and control lines are shown in dashed form and voltage bus lines are shown in solid form.

Figure 3:
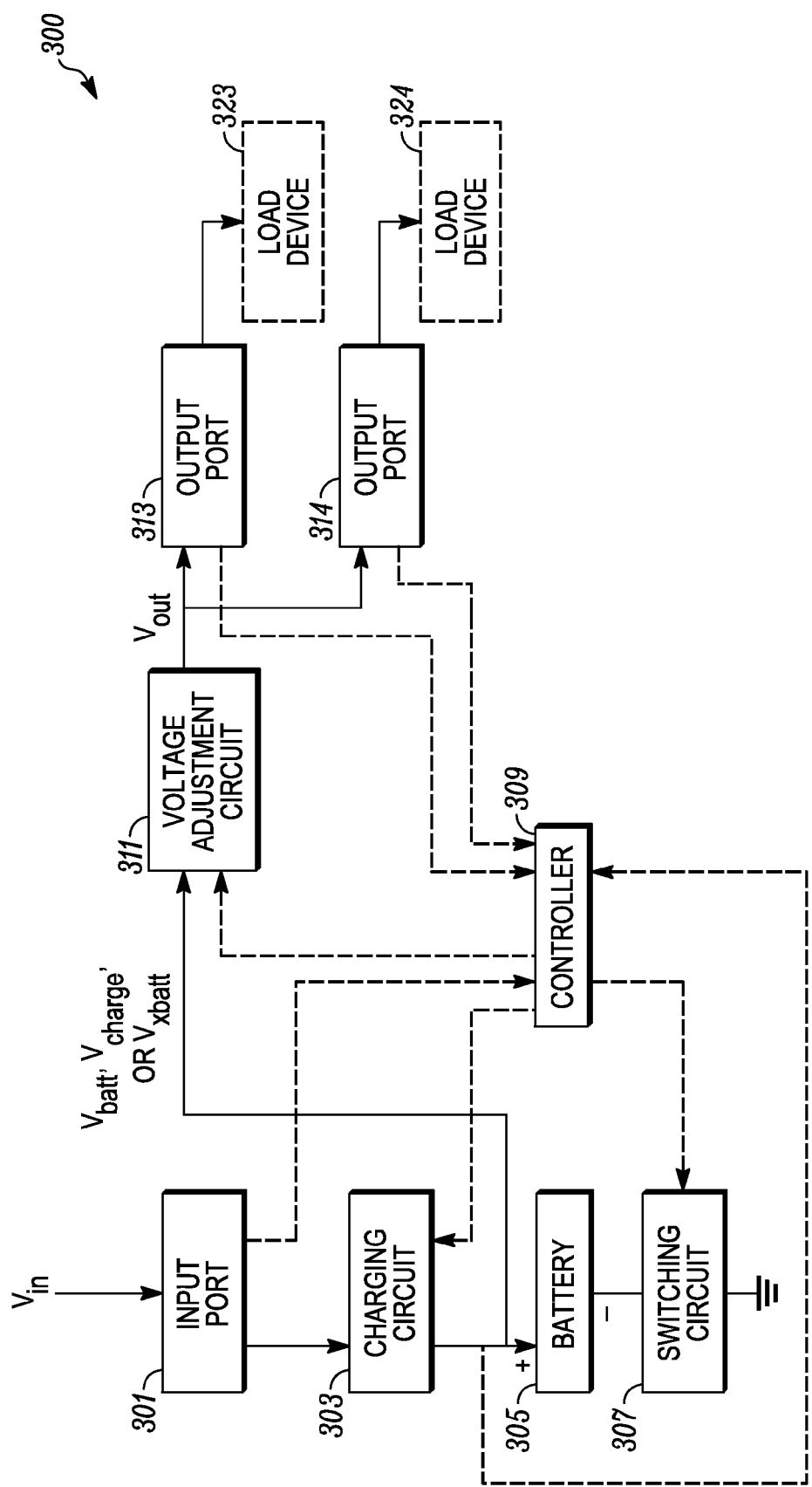
FIG. 3 illustrates an electrical block diagram of a DC power source that efficiently supplies specification-compliant output voltage to one or more output ports, in accordance with one exemplary embodiment of the present disclosure.
Figure 4:
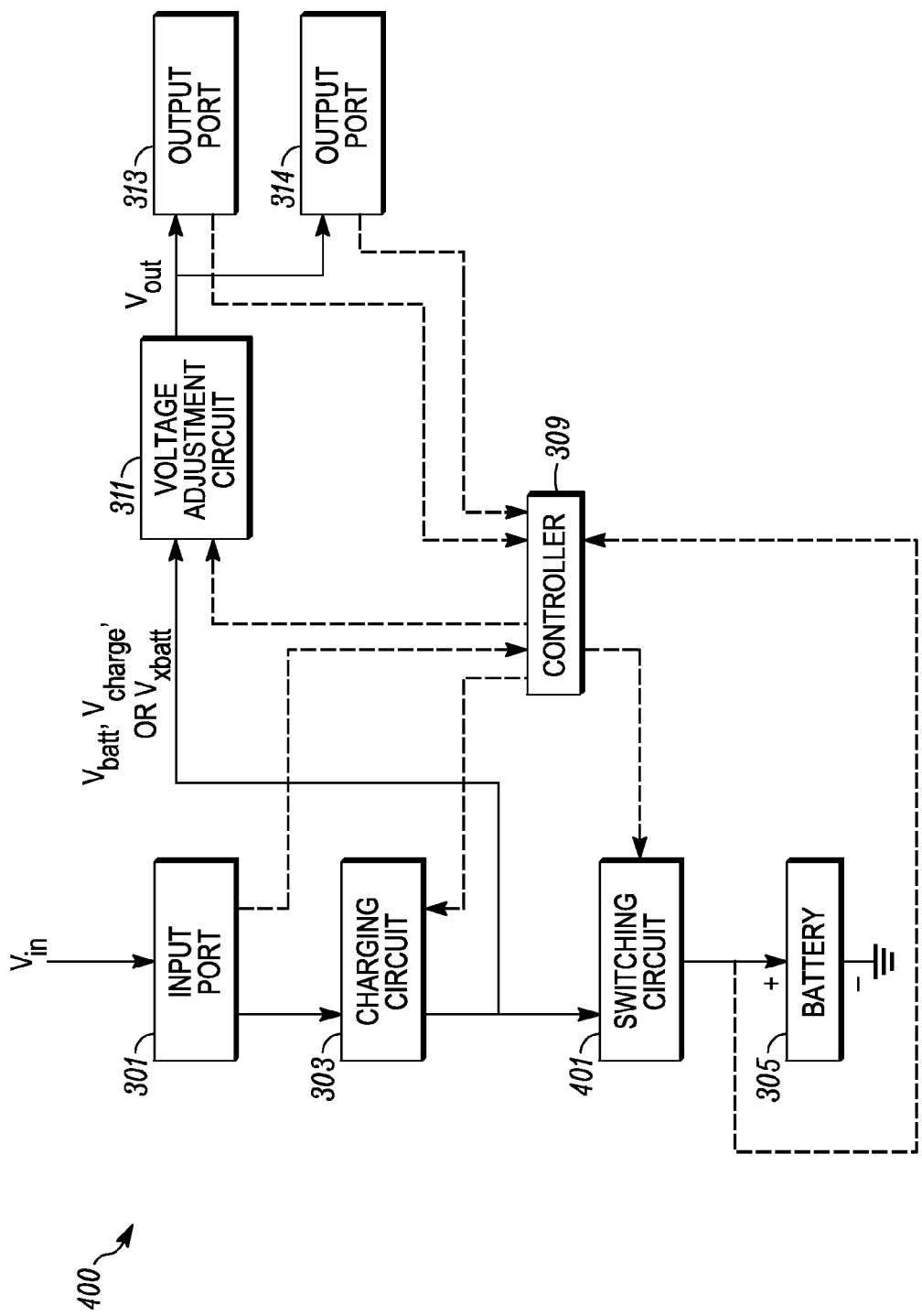
FIG. 4 illustrates an electrical block diagram of a DC power source that efficiently supplies specification-compliant output voltage to one or more output ports, in accordance with another exemplary embodiment of the present disclosure.

FIGS. 3 and 4 illustrate electrical block diagrams of exemplary DC power sources 300, 400 that efficiently supply a specification-compliant output voltage to one or more output ports 313-314. DC power source 300 includes an input port 301, a battery charging circuit 303 configured with optional battery protection (e.g., including conventional over-voltage protection, over-current protection, and under-voltage protection), a rechargeable battery 305, a switching circuit 307, a controller 309, a voltage adjustment circuit 311, and one or more output ports 313-314. DC power source 400 is similar to power source 300, except that it excludes switching circuit 307 and includes switching circuit 401. The two switching circuits 307, 401 are described in more detail below.

The input port 301 and each output port 313-314 may be ports that comply with one or more industry specifications. For example, the input port 301 and each output port 313-314 may be USB-compliant (e.g., a full-sized USB connector or a microUSB connector). The battery charging circuit 303 may be a conventional linear or switch-mode charging circuit appropriate for the battery chemistry used in the rechargeable battery 305. For example, for a lithium-ion battery chemistry, the battery charging circuit 303 may include a Model BQ24251 switch-mode lithium-ion battery charging integrated circuit (IC), which is commercially available from Texas Instruments Incorporated. The battery charging circuit 303 is operable during normal operation to produce a battery charging voltage (Vcharge) from an input voltage (Vin) received at the input port 301.

The rechargeable battery 305 may include one or more cells of a selected battery chemistry. For example, where the power source 300 is designed for supplying power to portable electronic devices, such as cellular phones, smartphones, tablet computers, or portable gaming devices, the battery 305 may include one or more cells of any of the following battery chemistries: lithium-ion, lithium-polymer, or lithium-sulfur. Alternatively, other known or future-developed battery chemistries may be utilized for the rechargeable battery 305.

The switching circuit 307 may be positioned between the negative terminal of the battery 305 and a ground potential, as illustrated in FIG. 3. Alternatively, a similar or differently-constructed switching circuit 401 may be positioned between the positive terminal of the battery 305 and an output of the battery charging circuit 303, as illustrated in FIG. 4. The switching circuit 307, 401 may form part of the battery charging circuit 303 and, more particularly, part of the charging circuit's battery protection circuitry, such as part of an over-current/under-voltage protection circuit. For example, the switching circuit 307 may be a protection metal-oxide-semiconductor field-effect transistor (MOSFET) in the battery protection circuitry, which has its gate voltage controlled by the controller 309. Thus, when the switching circuit 307 is electronically opened by the controller 309, the switching circuit 307 safely decouples or floats the battery 305 in a manner similar to when the battery protection circuitry responds to an over-voltage, over-current, or under-voltage condition.

The controller 309 may include one or more microprocessors, one or more microcontrollers, one or more digital signal processors (DSPs), one or more digital signal controllers, one or more state machines, logic circuitry, or any other device or combination of devices that processes information and generates control signals based on operating or programming instructions stored in memory accessible by the controller 309, or based on combinatorial and/or sequential logic embodied in the construction of the device or combination of devices. One of ordinary skill in the art will readily recognize and appreciate that the controller 309 may optionally include its own embedded memory for storing the operating instructions. For example, the controller 309 may be an 8-bit microcontroller, such as the STM8S103 line of microcontrollers available from STMicroelectronics of Geneva, Switzerland.

The voltage adjustment circuit 311 may be a conventionally configured boost converter circuit that steps an input voltage up to a desired output voltage. For example, the voltage adjustment circuit 311 may include a model AAT2215 high current step-up regulator available from Skyworks Solutions, Inc. of Woburn, Mass. The voltage adjustment circuit 311 may boost or increase the battery charging voltage (Vcharge), the battery output voltage (Vbatt), or another voltage at the output of the battery charging circuit 303 (Vxbatt), as applicable, to the desired output voltage depending on whether the battery 305 has or has not been switched out of the system. According to one exemplary embodiment, the voltage to be delivered to the output port 313-314 (Vout) may be 4.75-5.25 Volts (V) in compliance with the USB specification. Where the input voltage is in the 4.0 V to 5.25 V range and only a slight voltage reduction occurs through the battery charging circuit 303 when the battery 305 has been electronically removed from the system (e.g., due to one or two MOSFET voltage drops in the battery charging circuit 303), the voltage adjustment circuit 311 need only increase or boost the voltage at the output of the battery charging circuit 303 (Vxbatt) slightly in order to comply with the specified output voltage range for the USB specification. As a result, the disclosed DC power source 300, 400 efficiently provides a specification-compliant output voltage when an input voltage is present.

According to the embodiment of FIG. 3, the controller 309 may be programmed to monitor the input port 301 for the presence of an input voltage and to monitor the output port or ports 313-314 for the presence of a load device or load devices 323-324. When the controller 309 determines that an input voltage is present at the input port 301 and a load device 323 is coupled to and optionally seeking to draw current from an output port 313, the controller 309 may provide a control signal to the switching circuit 307 to electronically decouple the battery 305 from the system. Once decoupled, the battery 305 no longer draws charging current from the battery charging circuit 303. Thus, the battery 305 no longer loads the battery charging circuit 303, thereby enabling the battery charging circuit 303 to operate in a "wide open" or "open circuit" mode of operation. After the battery 305 has been electronically decoupled, the voltage adjustment circuit 311 adjusts a voltage at the output of the battery charging circuit 303 so as to be within the specified output voltage in accordance with an applicable specification (e.g., the USB specification). In this case, the voltage at the output of the battery charging circuit 303 may be substantially similar to the input voltage (e.g., the input voltage less the voltage drops across one or two transistors within the battery charging circuit 303) because the decoupled battery 305 is no longer loading the battery charging circuit 303.

In an alternative embodiment in which the controller 309 is further programmed to monitor the battery voltage or another state-of-charge parameter (e.g., coulomb count) for the battery 305, the controller 309 may provide a control signal to the switching circuit 307 to electronically decouple the battery 305 from the system when the controller 309 determines that an input voltage is present at the input port 301, a load device 323 is coupled to an output port 313, and the battery voltage or other state-of-charge parameter indicates that the battery 305 is in a fully charged state. The battery 305 may be determined to be in a fully charged state when the battery voltage exceeds a threshold, such as a top-off threshold (e.g., a voltage at which charging current may be re-supplied to the battery 305 after the battery 305 has been previously fully charged).

Where the controller 309 monitors the battery's state of charge, the controller 309 may be further programmed to generate a control signal for coupling or re-coupling the battery 305 to the output of the battery charging circuit 303 responsive to determining that the battery 305 is in a fully charged state, an input voltage is not present at the input port 301, and at least one load device 323-324 is coupled to the output port(s) 313-314. In other words, the controller 309 may be programmed to couple the battery 305 to the input of the voltage adjustment circuit 311 (which shares a common node with the output of the battery charging circuit 303) when the battery 305 is charged and no input voltage is present, such that the load device 323-324 draws current from the battery 305.

Where the controller 309 monitors the battery's state of charge, the controller 309 may be additionally programmed to generate a control signal for coupling or re-coupling the battery 305 to the output of the battery charging circuit 303 responsive to determining that the battery 305 is in a discharged state, an input voltage is present at the input port 301, and at least one load device 323-324 is not coupled to the output port(s) 313-314. In other words, the controller 309 may be programmed to charge the battery 305 when the battery 305 is discharged, an input voltage is present, and load devices 323-324 are not present. Additional details regarding the software logic as executed by the controller 309 is provided below with regard to FIGS. 7A-7D.

Figure 5:
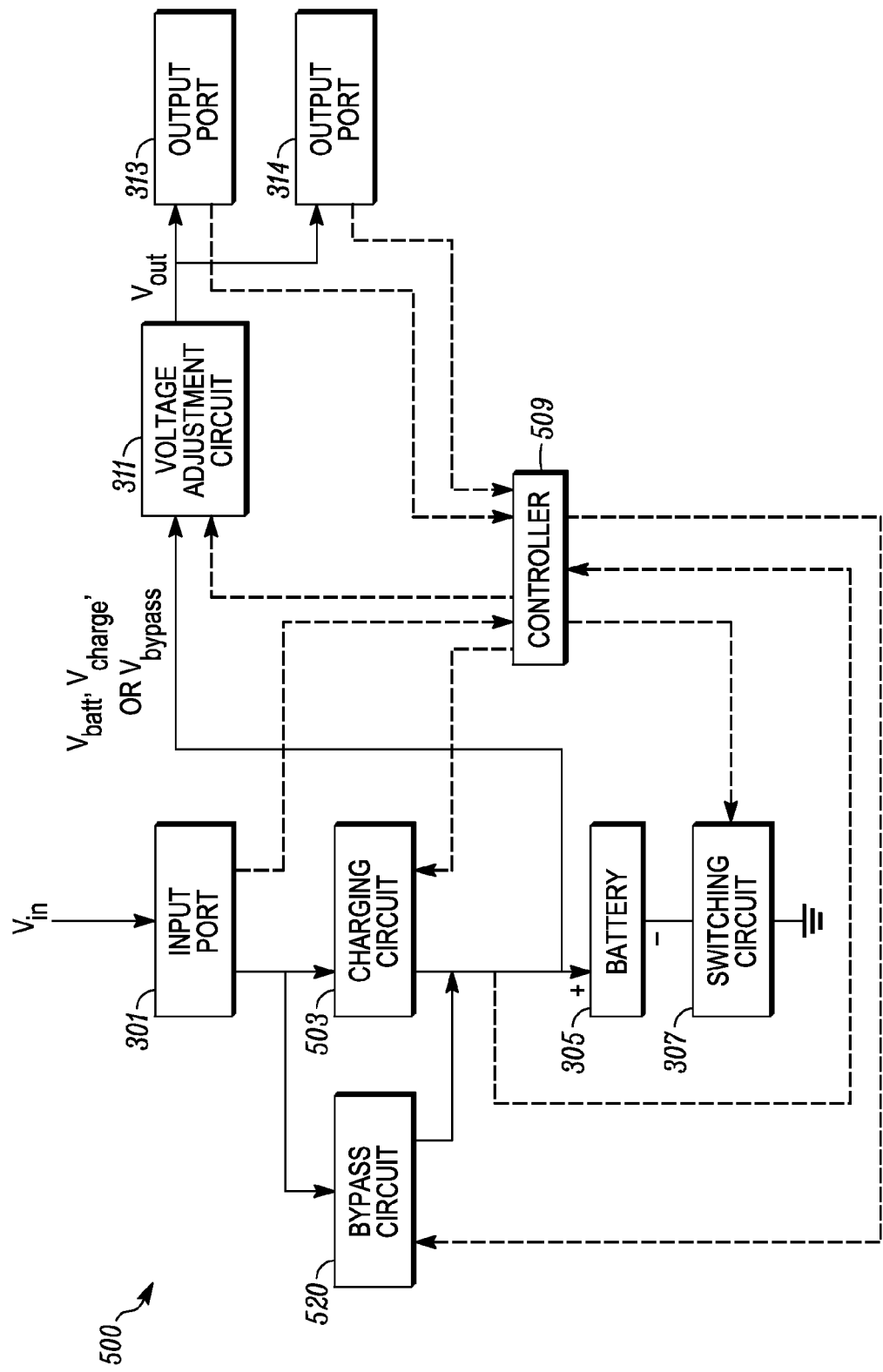
FIG. 5 illustrates an electrical block diagram of a DC power source that efficiently supplies specification-compliant output voltage to one or more output ports, in accordance with a further exemplary embodiment of the present disclosure.
Figure 6:
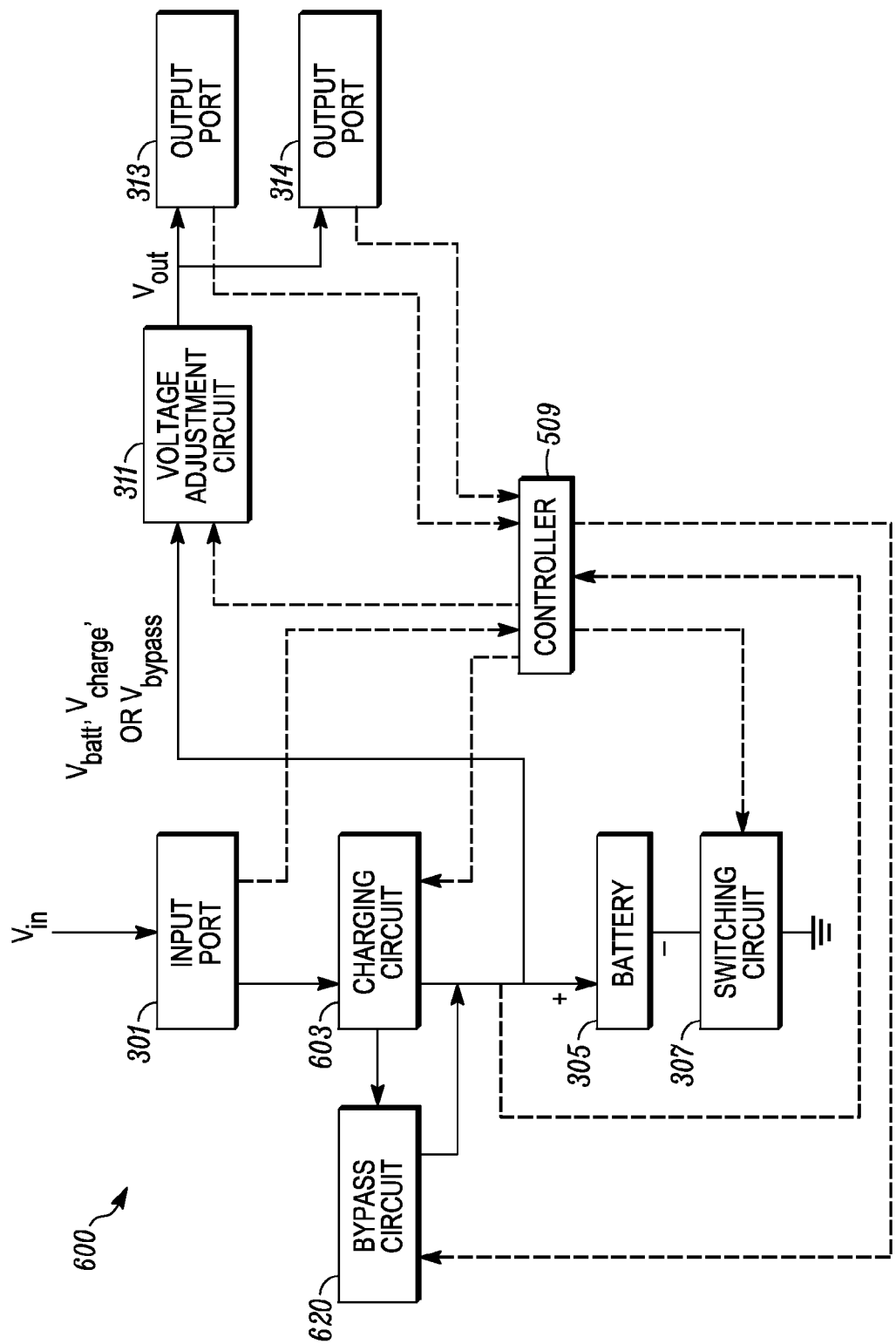
FIG. 6 illustrates an electrical block diagram of a DC power source that efficiently supplies specification-compliant output voltage to one or more output ports, in accordance with yet another exemplary embodiment of the present disclosure.
Figure 7A:
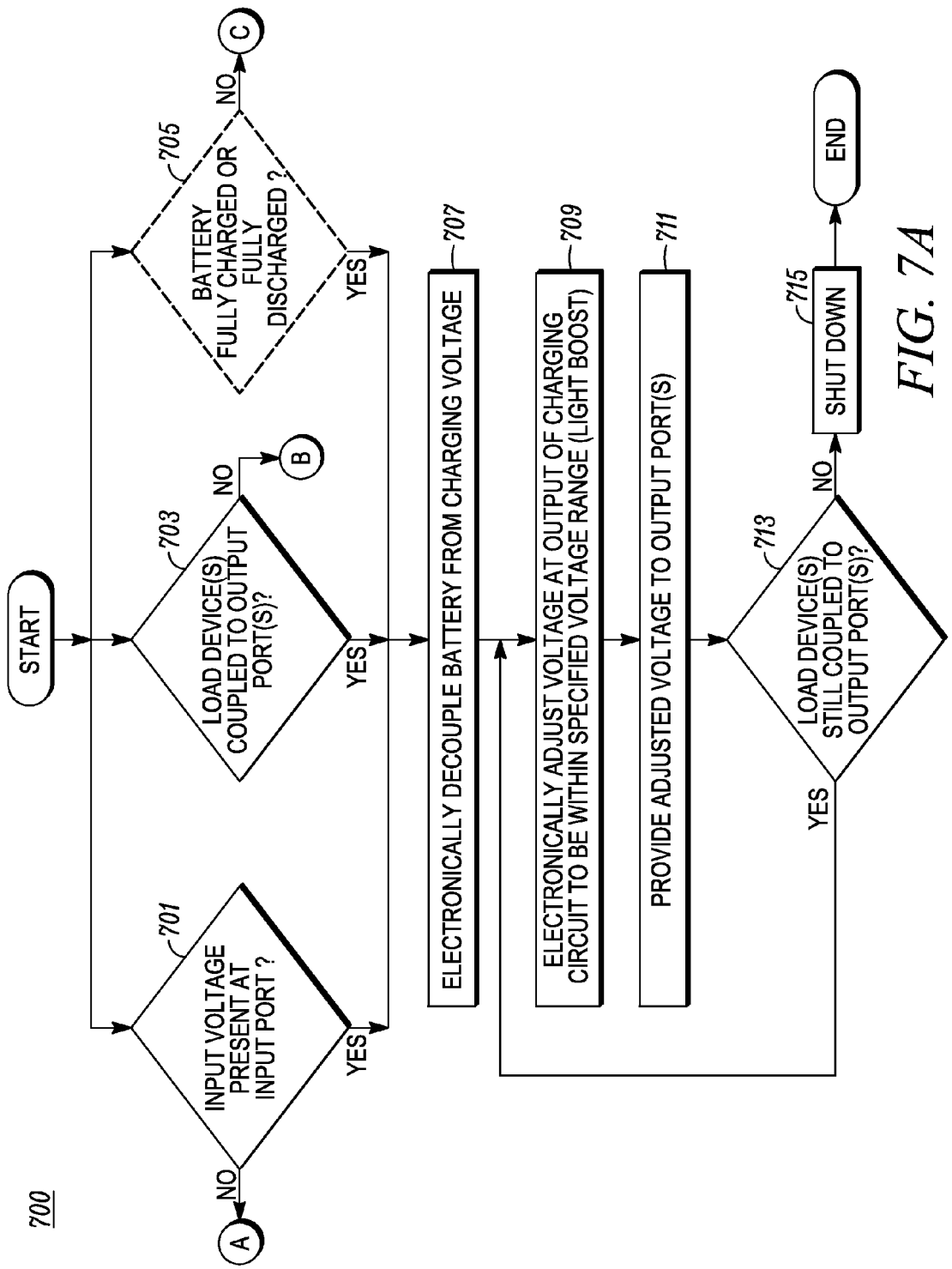
FIGS. 7A-7D collectively form a logic flow diagram of steps executed by a DC power source to supply a DC output voltage within a specified output voltage range to at least one output port of the power source, in accordance with a further exemplary embodiment of the present disclosure.
Figure 7B:
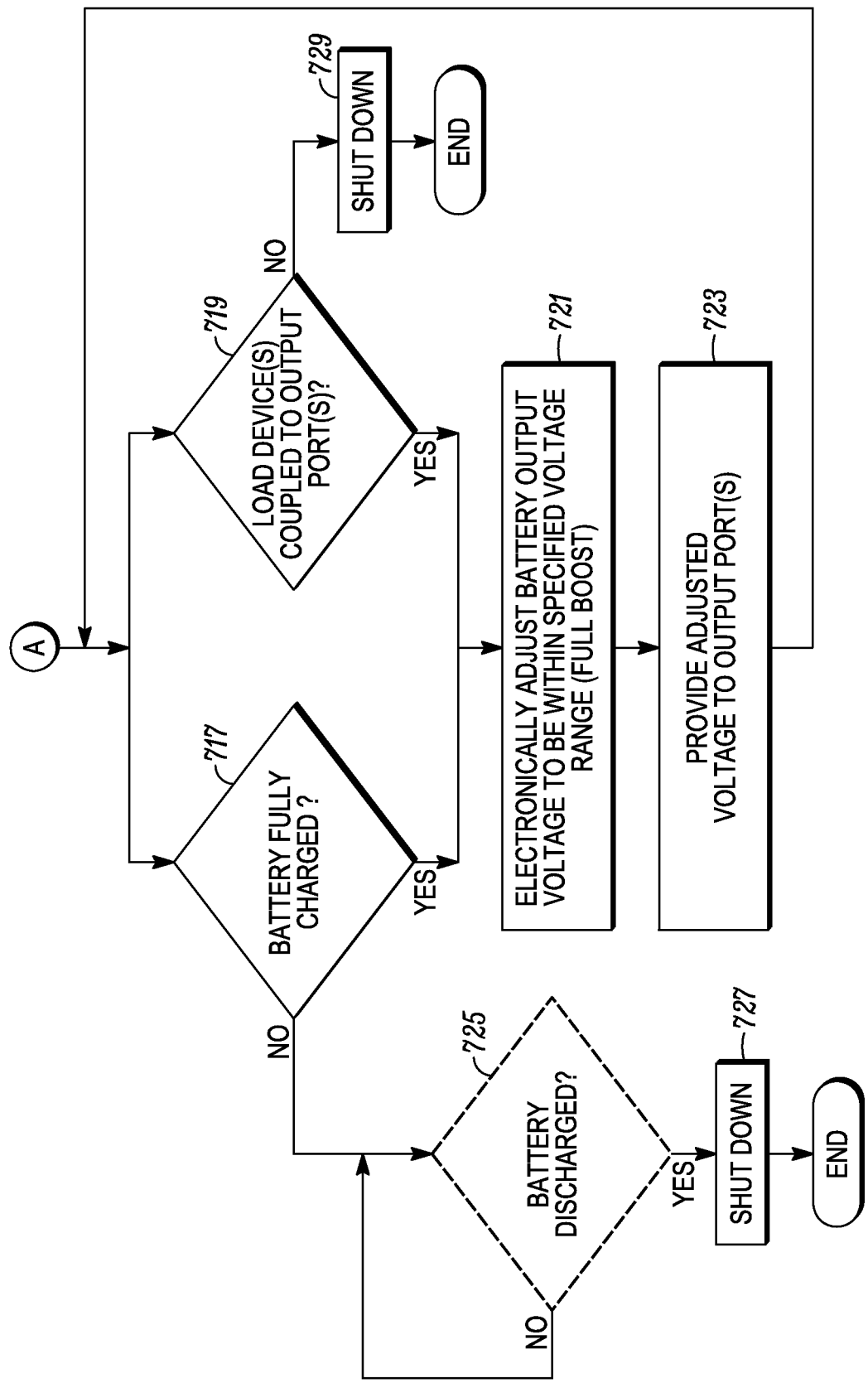
Figure 7C:
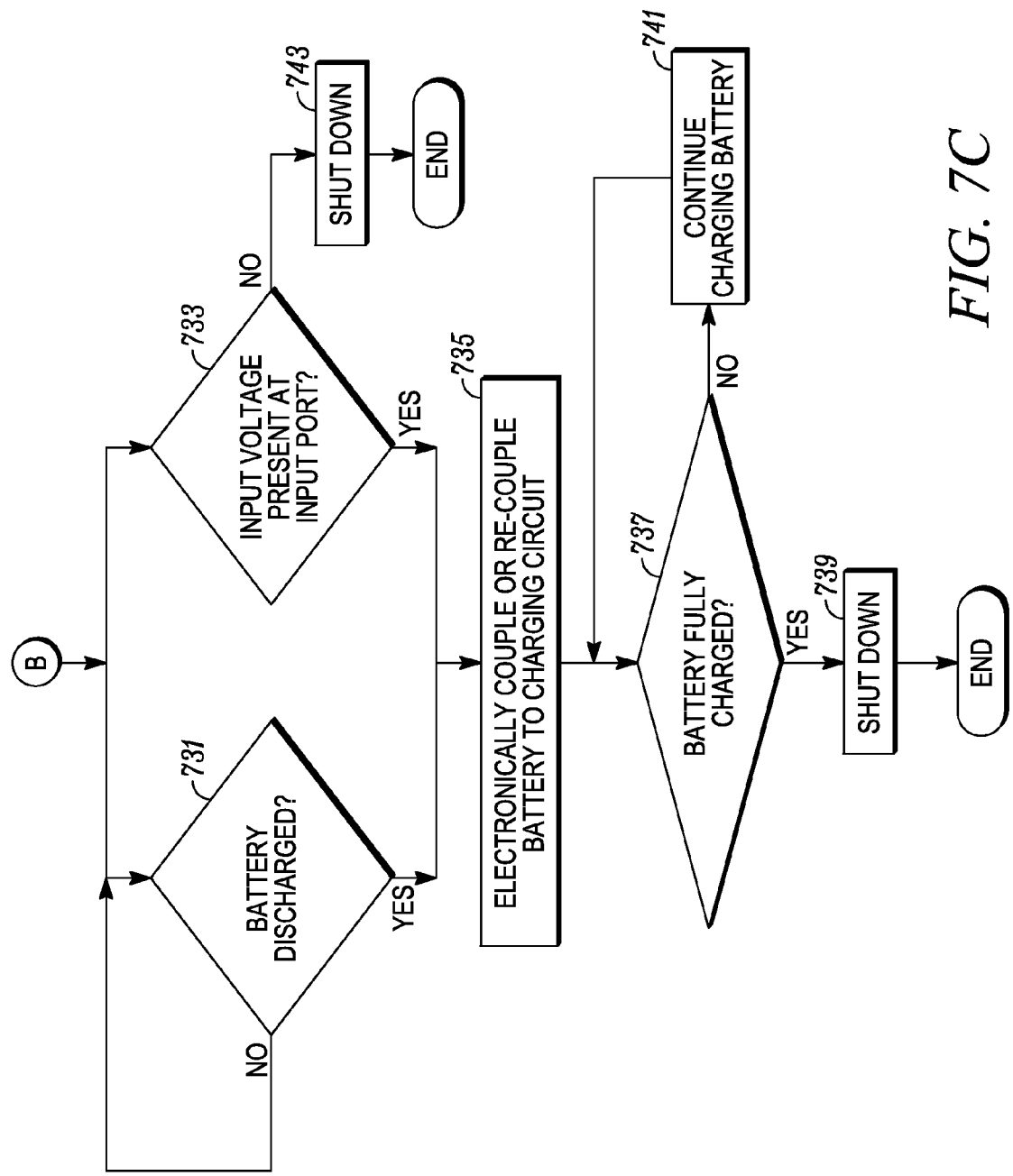
Figure 7D:
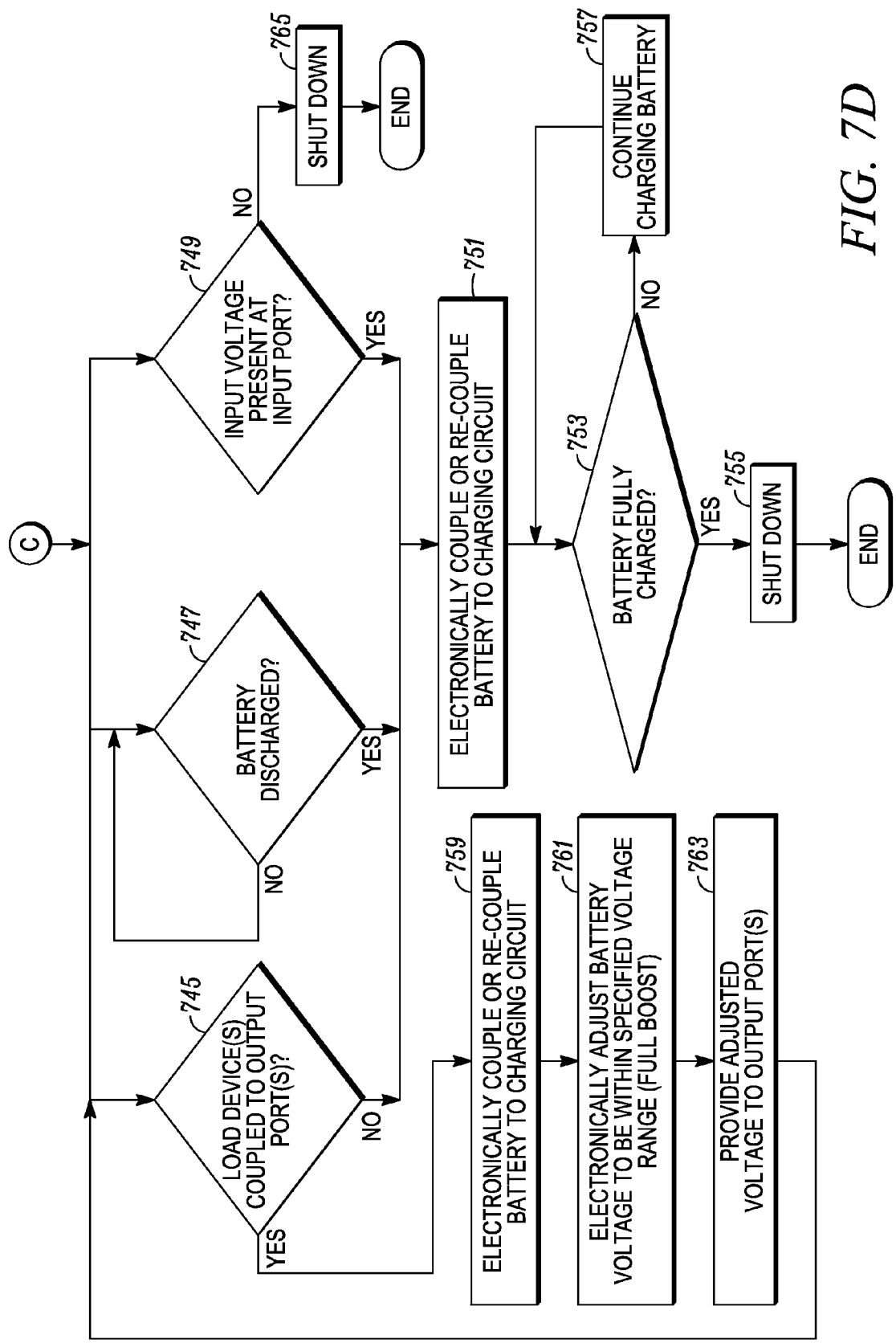

FIGS. 5 and 6 illustrate electrical block diagrams of alternative DC power sources 500, 600, which incorporate bypass circuits that, under certain circumstances, bypass all or a portion of a battery charging circuit to efficiently supply a specification-compliant output voltage to one or more output ports. The power sources 500, 600 of FIGS. 5 and 6 provide alternative embodiments for use when battery charging circuits prohibit wide open operation (i.e., with an open-circuited battery), as do certain commercially-available battery charging integrated circuits (ICs).

DC power source 500 includes an input port 301, a battery charging circuit 503 configured with optional battery protection (e.g., including over-voltage, over-current, and/or under-voltage protection), a bypass circuit 520, a rechargeable battery 305, a switching circuit 307, a controller 509, a voltage adjustment circuit 311, and one or more output ports 313-314. DC power source 600 is similar to power source 500, except for the battery charging circuit 603 and the bypass circuit 620. The two battery charging circuits 503, 603 and bypass circuits 520, 620 are described in more detail below.

The input port 301, the battery 305, the switching circuit 307, the voltage adjustment circuit 311, and the output port or ports 313-314 may be similar to those described above with respect to FIG. 3. The controller 509 is similar to controller 309, except that it is further programmed to control the bypass circuit 520, 620 of its respective power source 500, 600. The battery charging circuits 503, 603 of the power sources 500, 600 are similar to the battery charging circuit 303 of FIG. 3, except that they do not permit wide open operation. As a result, each power source 500, 600 includes a respective bypass circuit 520, 620 that may be activated by the controller 509 after the controller 509 activates the switching circuit 307 to electronically decouple the battery 307 from the charging circuit 503, 603.

The bypass circuit 520 of power source 500 couples the input port 301 to an output of the battery charging circuit 520 and, equivalently, to an input of the voltage adjustment circuit 311. Thus, when activated by the controller 509, the bypass circuit 520 functions to enable current to bypass the battery charging circuit 503. The bypass circuit 520 may be a MOSFET-based switch, wherein the MOSFET is selected to withstand a maximum voltage that may be applied to the input port 301. For example, where the battery charging circuit 503 includes battery protection circuitry that can protect the battery 305 from input voltages as high as 20 V (e.g., for a 4.0 V lithium-ion battery), the MOSFET selected for use in the bypass circuit 520 may be a 20 V device.

The bypass circuit 620 of power source 600 may also be a MOSFET-based switch. However, in this embodiment, the bypass circuit 620 is coupled between a secondary output of the battery charging circuit 603 and the primary output of the battery charging circuit 603. The secondary output of the battery charging circuit 603 may be over-voltage protected to be no greater than a maximum voltage that is substantially less than a maximum voltage that may be applied to the input port 301. The secondary output of the battery charging circuit 603 may be provided by a conventional "$P_{mid}$" output of the battery charging IC in the battery charging circuit 603. For example, where the battery charging circuit 603 includes battery protection circuitry that can protect the battery 305 from input voltages as high as 20 V (e.g., for a 4.0 V lithium-ion battery) and the $P_{mid}$ output of the battery charging circuit 603 is over-voltage protected to a maximum of 8.0 V, the bypass circuit 620 need only withstand an input up to 8.0 V, as opposed to 20 V. As a result, the MOSFET selected for use in the bypass circuit 620 of FIG. 6 may be an 8.0 V device instead of a 20 V device. The lower voltage requirement for the bypass circuit 620 of FIG. 6 permits use of a less robust and less costly MOSFET.

Besides the differences in the configurations and locations of the bypass circuits 520, 620, the power sources 500, 600 of FIGS. 5 and 6 function generally the same. In particular, the controller 509 operates in a manner similar to the controller 309 of FIG. 3 to decouple the battery 305 from the output of the battery charging circuit 503, 603 upon detecting that an input voltage is present at the input port and that one or more load devices 323-324 are coupled to one or more output ports 313-314, as well as optionally detecting that the battery 305 is fully charged or discharged. However, in contrast to the operation of the controller 309 of FIG. 3, the controller 509 of FIGS. 5 and 6 activates the bypass circuit 520, 620 to wholly or partially bypass the battery charging circuit 503, 603 after decoupling the battery 305 from the output of the battery charging circuit 503, 603 so as to prevent the battery charging circuit 503, 603 from operating in a prohibited wide open or open circuit operating mode. According to one particular embodiment, the controller 509 uses a "break then make" process for first decoupling the battery 305 and then activating the bypass circuit 520, 620 so as to maintain the over-voltage protection provided by the battery charging circuit 503, 603 until the battery 305 is decoupled from the system. Additional details regarding the software logic as executed by the controller 509 is provided below with regard to FIGS. 7A-7D.

FIGS. 7A-7D collectively form a logic flow diagram 700 of steps executed by a DC power source 300, 400, 500, 600 to supply a DC output voltage within a specified output voltage range to at least one output port of the power source, in accordance with exemplary embodiments of the present disclosure. The logic flow steps may be executed, as applicable, by various components of the DC power source 300, 400, 500, 600, including, but not limited to, the controller 309, 509 (and its constituent hardware and/or software modules), the switching circuit 307, 401, the voltage adjustment circuit 311, and the bypass circuit 520, 620. The steps executed by the controller 309, 509 are preferably performed in accordance with the operating instructions stored in a memory accessible by the controller 309, 509 (e.g., a memory embedded within the controller 309, 509), or based on combinatorial and/or sequential logic embodied in the construction of the device or combination of devices forming the controller 309, 509. For purposes of the following illustrative description of power source operation, reference will be primarily made to the DC power sources 300, 500, 600 illustrated in FIGS. 3, 5, and 6.

According to the exemplary logic flow, a controller 309, 509 of the DC power source monitors the input port 301, the output port(s) 313-314, and optionally the battery 305 to (a) determine (701) whether the an input voltage is present at the input port 301, (b) determine (703) whether one or more load devices 323-324 are coupled to one or more output ports 313-314, and (c) optionally determine (705) whether the battery 305 is in a fully charged state or in a fully discharged state. When the controller 309, 509 determines that the an input voltage is present at the input port 301, that one or more load devices 323-324 are coupled to one or more output ports 313-314, and optionally that the battery 305 is either in a fully charged state or a fully discharged state, the controller 309, 509 activates the switching circuit 307 to electronically disconnect or otherwise decouple (707) the battery 305 from the battery charging circuit 303, 503, 603, such that a voltage at an output of the battery charging circuit 303, 503, 603 is applied as an input to the voltage adjustment circuit 311. The voltage adjustment circuit 311 electronically adjusts (709) (e.g., converts, such as by stepping up or stepping down, as appropriate) the voltage at the output of the battery charging circuit 303, 503, 603 so as to be within a specified voltage range, which may correspond to an industry standard such as the USB specification. As discussed above, the voltage at the output of the battery charging circuit 303, 503, 603 may be an output voltage of the battery charging circuit 303, 503, 603 or an output voltage of a bypass circuit 520, 620. The voltage adjustment circuit 311 provides (711) the adjusted (e.g., converted) voltage to the output port or ports 313-314 to which the load device or devices 323-324 are coupled.

After the adjusted voltage has been supplied to the output port(s) 313-314, the DC power source, through its controller 309, 509, continues to determine (713) whether at least one load device 323-324 is still coupled to at least one output port 313-314. If no load device 323-324 is coupled to an output port 313, 314, the DC power source enters (715) a shutdown mode; otherwise, the voltage adjustment circuit 311 continues to adjust (709) the voltage at the output of the battery charging circuit 303, 503, 603 so as to be within the specified voltage range and provide (711) the adjusted voltage to the output port or ports 313-314 to which a load device or devices 323-324 are coupled.

If the DC power source's controller 309, 509 initially determines (701) that an input voltage is not present at the input port 301, the controller 309, 509 may determine (717) whether the battery 305 is fully charged and/or determine (719) whether one or more load devices 323-324 are coupled to one or more output ports 313-314. The determinations of the battery's state of charge and the presence of one or more load devices 323-324 may have been made initially as described above with respect to decision blocks 703 and 705. When the controller 309, 509 determines that the input voltage is not present at the input port 301, the battery 305 is fully charged, and at least one load device 323-324 is coupled to the output port(s) 313-314, the controller 309, 509 keeps the battery 305 coupled to the output of the battery charging circuit 303, 503, 603 such that the battery output voltage is applied to the input of the voltage adjustment circuit 311. The voltage adjustment circuit electronically adjusts (721) (e.g., converts, such as by stepping up or stepping down, as appropriate) the battery voltage so as to be within the specified voltage range and provides (723) the adjusted voltage to the output port(s) 313-314 to which the load device(s) is coupled.

If, after initially determining (701) that an input voltage is not present at the input port 301, the controller 309, 509 also determines (717) that the battery 305 is not fully charged, the controller 309, 509 may determine (725) whether the battery 305 is in a discharged state. If the battery 305 is discharged (e.g., output voltage less than a minimum threshold), the controller 309, 509 may cause the DC power source to enter (727) a shutdown mode; otherwise, the controller 309, 509 continues to determine whether the battery 305 has become discharged. If, after initially determining (701) that an input voltage is not present at the input port 301, the controller 309, 509 determines (719) that there are no load devices 323-324 coupled to the DC power source's output ports 313-314, the controller 309, 509 may cause the DC power source to enter (729) a shutdown mode.

If, after initially determining (703) that there are no load devices 323-324 coupled to the power source's output ports 313-314, the controller 309, 509 also determines (731) that the battery 305 is discharged and determines (733) that an input voltage is present at the input port 301, the controller 309, 509 may deactivate the switching circuit 307 or maintain the switching circuit 307 in a deactivated state so as to electronically couple or re-couple (735) the battery 305 to the output of the battery charging circuit 303, 503, 603. In other words, if the battery 305 is discharged, an input voltage is present, and no load devices 323-324 are present, then the controller 309, 509 may continue or commence charging of the battery 305. The determinations of the battery's state of charge and the presence of an input voltage may have been made initially as described above with respect to decision blocks 701 and 705. The controller 309, 509 monitors the battery's state of charge to determine (737) whether the battery 305 is fully charged. If the battery 305 is not fully charged, the controller 309, 509 maintains activation of the battery charging circuit 303, 503, 603 to continue (741) charging the battery 305. On the other hand, if the battery 305 is fully charged and there is still no load device 323-324 coupled to an output port 313-314, the controller 309, 509 may cause the DC power source to enter (739) a shutdown mode. The controller 309, 509 may also cause the DC power source to enter (743) a shutdown mode when the controller 309, 509 initially determines (703) that there are no load devices 323-324 coupled to the power source's output ports 313-314 and there is no input voltage present at the input port 301.

If, after initially optionally determining (705) that the battery 305 is not fully charged, the controller 309, 509 also determines (745) that there is no load device 323-324 coupled to an output port 313-314, determines (747) that the battery 305 is discharged, and determines (749) that an input voltage is present at the input port 301, then the controller 309, 509 may deactivate the switching circuit 307 or maintain the switching circuit 307 in a deactivated state so as to electronically couple or re-couple (751) the battery 305 to the output of the battery charging circuit 303, 503, 603. In other words, if the battery 305 is discharged, an input voltage is present, and no load devices 323-324 are present, then the controller 309, 509 may continue or commence charging of the battery 305. The determinations of the presence of one or more load devices 323-324 and the presence of an input voltage may have been made initially as described above with respect to decision blocks 701 and 703. The controller 309, 509 monitors the battery's state of charge to determine (753) whether the battery 305 is fully charged. If the battery 305 is not fully charged, the controller 309, 509 maintains activation of the battery charging circuit 303, 503, 603 to continue (757) charging the battery 305. On the other hand, if the battery 305 is fully charged and there is still no load device 323-324 coupled to an output port 313-314, the controller 309, 509 may cause the DC power source to enter (755) a shutdown mode. The controller 309, 509 may also cause the DC power source to enter (765) a shutdown mode when the controller 309, 509 initially determines (705) that the battery 305 is not fully charged and there is no input voltage present at the input port 301.

If, after initially determining (705) that the battery 305 is not fully charged or not fully discharged, the controller 309, 509 also determines (745) that there is at least one load device 323-324 coupled to an output port 313-314, then the controller 309, 509 may deactivate the switching circuit 307 or maintain the switching circuit 307 in a deactivated state so as to electronically couple or re-couple (759) the battery 305 to the output of the battery charging circuit 303, 503, 603 (and equivalently the input to the voltage adjustment circuit 311). In other words, if the battery 305 is not fully charged and not fully discharged, and there is a load device 323-324 present at an output port 313-314, then the controller 309, 509 may allow the battery 305 to supply power to the attached load device 323-324. In such a case, the voltage adjustment circuit 311 may electronically adjust (761) the battery voltage to be within the specified voltage range and provide (763) the adjusted (e.g., converted) voltage to the output port 313-314 to which the load device 323-324 is coupled. Additionally, the controller 309, 509 may continue to monitor the output port(s) 313-314 for the presence of one or more load devices 323-324.

The present disclosure relates to a DC power source and associated methods of operation to enable the DC power source to supply a DC output voltage within a specified output voltage range to at least one output port. The disclosed power source and methods are more efficient than conventional power sources because they do not drop the input voltage down to the battery voltage when the input voltage is present and a load device is connected to the power source. To avoid dropping the input voltage down to the battery voltage or a charging voltage for the battery, the disclosed power source decouples or floats the battery so as to enable a substantially higher voltage to be applied to the voltage adjustment circuit (e.g., boost converter circuit), thereby minimizing the amount of adjustment necessary for the output voltage to be maintained within the specified voltage range (which may be compliant with an industry standard, such as the USB specification). The disclosed power source also facilitates use of a bypass circuit depending upon the limitations and configuration of the battery charging circuit. For example, where the battery charging circuit does not permit wide open or open circuit operation, the battery charging circuit may be bypassed using an electronically controlled switch (e.g., a MOSFET switch) to pass a slightly reduced version of the input voltage to the voltage adjustment circuit. Finally, by adjusting the voltage supplied by the battery charging circuit or the bypass circuit when the battery is floated, the disclosed power source compensates for any droop that may occur to the input voltage so as to insure that the output voltage remains within the specified voltage range.

As detailed above, embodiments of the disclosed DC power source and operational methods reside primarily in combinations of process steps and/or apparatus components related to enabling a DC power source to supply a DC output voltage within a specified output voltage range to at least one output port. Accordingly, the apparatus components and process steps have been represented, where appropriate, by conventional symbols in the drawings, showing only those specific details that are pertinent to understanding the embodiments of the present invention so as not to obscure the disclosure with details that will be readily apparent to those of ordinary skill in the art having the benefit of the description herein. Additionally, while FIGS. 7A-7D illustrate one exemplary order for implementing process steps of the disclosed method, those skilled in the art will recognize and appreciate that the order of steps which are not dependent upon other steps may be changed as desired without departing from the spirit and scope of the present invention as set forth in the appended claims.

In this document, relational terms such as "first" and "second," "top" and "bottom," and the like may be used solely to distinguish one element or action from another element or action without necessarily requiring or implying any actual relationship or order between such elements or actions. The terms "comprises," "comprising," "includes," "including," "has," "having," "contains," "containing," and any other variations thereof are intended to cover a non-exclusive inclusion, such that a process, method, device, article, or apparatus that comprises, includes, has, or contains a list of elements does not include only those elements but may include other elements not expressly listed or inherent to such process, method, device, article, or apparatus. The term "plurality of" as used in connection with any element or action means two or more of such element or action. A claim element proceeded by the article "a" or "an" does not, without more constraints, preclude the existence of additional identical elements in the process, method, device, article, or apparatus that includes the element.

It will be appreciated that embodiments of the DC power source 300, 400, 500, 600 described herein may be comprised of one or more conventional processors or controllers and unique stored program instructions that control the processor(s) or controller(s) to implement, in conjunction with certain non-processor circuits, some, most, or all of the functions of the DC power source 300, 400, 500, 600 and its operational methods as described herein. The non-processor circuits may include, but are not limited to, the switching circuit 307, the voltage adjustment circuit 311, and the bypass circuit 520, 620, as well as filters, clock circuits, and various other non-processor circuits. As such, the functions of the processor and non-processor circuits may be collectively interpreted as steps of a method for a DC power source to supply a DC output voltage within a specified output voltage range to at least one output port. Alternatively, some or all functions of the controller 309, 509 could be implemented by a state machine that has no stored program instructions, or in one or more application specific integrated circuits (ASICs), in which each function or some combinations of functions are implemented as custom logic. Of course, a combination of the various approaches could be used. Thus, methods and means for these functions have been generally described herein. Further, it is expected that one of ordinary skill, notwithstanding possibly significant effort and many design choices motivated by, for example, available time, current technology, and economic considerations, when guided by the concepts and principles disclosed herein will be readily capable of generating software instructions or programs and/or integrated circuits to implement the process disclosed herein without undue experimentation.

In the foregoing specification, specific embodiments of a DC power source and its operational methods have been described. However, one of ordinary skill in the art will appreciate that various modifications and changes can be made without departing from the scope of the present invention as set forth in the appended claims. Accordingly, the specification and figures are to be regarded in an illustrative rather than a restrictive sense, and all such modifications are intended to be included within the scope of the disclosed apparatus and methods. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims and all equivalents of those claims as issued.

What is claimed is:

1. A method for a direct current (DC) power source to supply a DC output voltage within a specified output voltage range to at least one output port, the DC power source including a battery charging circuit coupled to a rechargeable battery, the method comprising:
   determining whether an input voltage is present at an input port of the DC power source, the input voltage being usable to produce a battery charging voltage during normal operation of the battery charging circuit;
   determining whether at least one load device is coupled to the at least one output port; and
   when the input voltage is present at the input port of the DC power source and at least one load device is coupled to the at least one output port,
      electronically decoupling the rechargeable battery from the battery charging circuit,
      electronically adjusting a voltage at an output of the battery charging circuit so as to be within the specified output voltage range to produce an adjusted voltage, and
      providing the adjusted voltage to the at least one output port, wherein electronically decoupling the rechargeable battery from the battery charging circuit comprises:
         electronically disconnecting a negative terminal of the rechargeable battery from a ground potential.

2. The method of claim 1, wherein electronically disconnecting a negative terminal of the rechargeable battery from a ground potential comprises:
   electronically opening a switch positioned between the negative terminal and the ground potential.

3. A method for a direct current (DC) power source to supply a DC output voltage within a specified output voltage range to at least one output port, the DC power source including a battery charging circuit coupled to a rechargeable battery, the method comprising:
   determining whether an input voltage is present at an input port of the DC power source, the input voltage being usable to produce a battery charging voltage during normal operation of the battery charging circuit;
   determining whether at least one load device is coupled to the at least one output port; and
   when the input voltage is present at the input port of the DC power source and at least one load device is coupled to the at least one output port,
      electronically decoupling the rechargeable battery from the battery charging circuit,
      electronically adjusting a voltage at an output of the battery charging circuit so as to be within the specified output voltage range to produce an adjusted voltage, and
      providing the adjusted voltage to the at least one output port;
   determining whether the rechargeable battery is in a fully charged state;
   when the rechargeable battery is in a fully charged state, the input voltage is not present at the input port of the DC power source, and at least one load device is coupled to the at least one output port, electronically adjusting an output voltage of the rechargeable battery so as to be within the specified output voltage range to produce a second adjusted voltage; and
   providing the second adjusted voltage to the at least one output port, wherein determining whether the rechargeable battery is in a fully charged state comprises:
      determining whether an output voltage of the rechargeable battery is greater than a top-off threshold.

4. The method of claim 3, wherein electronically adjusting an output voltage of the rechargeable battery so as to be within the specified output voltage range comprises:
   boosting the output voltage of the rechargeable battery so as to be within the specified output voltage range.

5. A method for a direct current (DC) power source to supply a DC output voltage within a specified output voltage range to at least one output port, the DC power source including a battery charging circuit coupled to a rechargeable battery, the method comprising:
   determining whether an input voltage is present at an input port of the DC power source, the input voltage being usable to produce a battery charging voltage during normal operation of the battery charging circuit;
   determining whether at least one load device is coupled to the at least one output port; and
   when the input voltage is present at the input port of the DC power source and at least one load device is coupled to the at least one output port,
      electronically decoupling the rechargeable battery from the battery charging circuit,
      electronically adjusting a voltage at an output of the battery charging circuit so as to be within the specified output voltage range to produce an adjusted voltage, and
      providing the adjusted voltage to the at least one output port;
   determining whether the rechargeable battery is in a discharged state; and when the rechargeable battery is in a discharged state, the input voltage is present at the input port of the DC power source, and at least one load device is not coupled to the at least one output port, electronically re-coupling the rechargeable battery to the battery charging circuit.

6. The method of claim 5, wherein determining whether the rechargeable battery is in a discharged state comprises:
determining whether an output voltage of the rechargeable battery is less than a minimum voltage threshold.

7. The method of claim 5, wherein the specified output voltage range is based on a Universal Serial Bus (USB) standard.

8. The method of claim 5, wherein electronically adjusting a voltage at an output of the battery charging circuit so as to be within the specified output voltage range comprises:
boosting the voltage at the output of the battery charging circuit so as to be within the specified output voltage range.

9. A method for a direct current (DC) power source to supply a DC output voltage within a specified output voltage range to at least one output port, the DC power source including a battery charging circuit coupled to a rechargeable battery, the method comprising:
determining whether an input voltage is present at an input port of the DC power source, the input voltage being usable to produce a battery charging voltage during normal operation of the battery charging circuit;
determining whether at least one load device is coupled to the at least one output port;
determining whether the rechargeable battery is in a fully charged state; and
when the input voltage is present at the input port of the DC power source, the rechargeable battery is in a fully charged state, and at least one load device is coupled to the at least one output port,
electronically decoupling the rechargeable battery from the battery charging circuit,
electronically adjusting a voltage at an output of the battery charging circuit so as to be within the specified output voltage range to produce an adjusted voltage, and
providing the adjusted voltage to the at least one output port.

10. A method for a direct current (DC) power source to supply a DC output voltage within a specified output voltage range to at least one output port, the DC power source including a battery charging circuit coupled to a rechargeable battery, the method comprising:
determining whether an input voltage is present at an input port of the DC power source, the input voltage being usable to produce a battery charging voltage during normal operation of the battery charging circuit;
determining whether at least one load device is coupled to the at least one output port;
determining whether the rechargeable battery is in a discharged state; and
when the input voltage is present at the input port of the DC power source, the rechargeable battery is in a discharged state, and at least one load device is coupled to the at least one output port,
electronically decoupling the rechargeable battery from the battery charging circuit,
electronically adjusting a voltage at an output of the battery charging circuit so as to be within the specified output voltage range to produce an adjusted voltage, and
providing the adjusted voltage to the at least one output port.

11. A direct current (DC) power source comprising:
an input port operable to receive an input voltage;
a battery charging circuit coupled to the input port and operable during normal operation to output a battery charging voltage based on the input voltage;
a rechargeable battery;
a switching circuit configured to selectively couple and decouple the rechargeable battery and an output of the battery charging circuit responsive to control signals;
a voltage adjustment circuit coupled to the output of the battery charging circuit and operable to adjust a voltage at the output of the battery charging circuit or an output voltage of the rechargeable battery so as to be within a specified output voltage range to produce an adjusted voltage;
at least one output port coupled to an output of the voltage adjustment circuit, the at least one output port enabling at least one load device to be coupled to the DC power source; and
a controller operably coupled to the input port, the switching circuit, and the at least one output port, the controller being operable to generate the control signals for selectively coupling and decoupling the rechargeable battery and the battery charging circuit,
wherein the controller generates and supplies a control signal to the switching circuit for decoupling the rechargeable battery from the battery charging circuit responsive to determining that the input voltage is present at the input port and at least one load device is coupled to the at least one output port.

12. The DC power source of claim 11, wherein the switching circuit is positioned between a negative terminal of the rechargeable battery and a ground potential.

13. The DC power source of claim 11, wherein the battery charging circuit includes over-voltage protection.

14. The DC power source of claim 11, wherein the voltage adjustment circuit is a boost converter circuit.

15. The DC power source of claim 11, further comprising:
a bypass circuit connected between the input port and the output of the battery charging circuit, the bypass circuit being operable to selectively couple and decouple the input port and the output of the battery charging circuit responsive to bypass control signals generated by the controller;
wherein the controller generates a bypass control signal causing the bypass circuit to couple the input port to the output of the battery charging circuit after the controller generates the control signal for decoupling the rechargeable battery from the output of the battery charging circuit, and
wherein the voltage adjustment circuit is further operable to adjust an output voltage of the bypass circuit so as to be within the specified output voltage range to produce the adjusted voltage.

16. The DC power source of claim 11, wherein the battery charging circuit provides a second output that is over-voltage protected to be no greater than a first maximum voltage, wherein the first maximum voltage is less than a second maximum voltage that can be applied to the input port, and wherein the portable DC power source further comprises:
a bypass circuit connected between the output of the battery charging circuit and the second output of the battery charging circuit, the bypass circuit operable to selectively couple and decouple the output of the battery charging circuit and the second output of the battery charging circuit responsive to bypass control signals generated by the controller;

wherein the controller generates a bypass control signal causing the bypass circuit to couple the output of the battery charging circuit and the second output of the battery charging circuit after the controller generates the control signal for decoupling the rechargeable battery from the battery charging circuit, and wherein the voltage adjustment circuit is further operable to adjust an output voltage of the bypass circuit so as to be within the specified output voltage range to produce the adjusted voltage.

17. The DC power source of claim 11, wherein the specified output voltage range is based on a Universal Serial Bus (USB) standard.

18. The DC power source of claim 11, wherein the controller is further coupled to the rechargeable battery and further operable to:

determine a state of charge for the rechargeable battery; and generate a control signal for coupling the rechargeable battery to the output of the battery charging circuit responsive to determining that the rechargeable battery is in a fully charged state, the input voltage is not present at the input port, and at least one load device is coupled to the at least one output port.

19. The DC power source of claim 11, wherein the controller is further coupled to the rechargeable battery and further operable to:

determine a state of charge for the rechargeable battery; and generate a control signal for coupling the rechargeable battery to the battery charging circuit responsive to determining that the rechargeable battery is in a discharged state, the input voltage is present at the input port, and at least one load device is not coupled to the at least one output port.

20. A direct current (DC) power source comprising:

an input port operable to receive an input voltage;

a battery charging circuit coupled to the input port and operable during normal operation to output a battery charging voltage based on the input voltage;

a bypass circuit connected between the input port and an output of the battery charging circuit, the bypass circuit operable to selectively couple and decouple the input port and the output of the battery charging circuit responsive to bypass control signals;

a rechargeable battery;

a switching circuit configured to selectively couple and decouple the rechargeable battery and the output of the battery charging circuit responsive to switching control signals;

a voltage adjustment circuit coupled to the output of the battery charging circuit and operable to adjust one of the battery charging voltage, an output voltage of the rechargeable battery, and an output voltage of the bypass circuit so as to be within a specified output voltage range to produce an adjusted voltage;

at least one output port coupled to an output of the voltage adjustment circuit, the at least one output port enabling at least one load device to be coupled to the DC power source; and a controller operably coupled to the input port, the switching circuit, the bypass circuit, the battery charging circuit, and the at least one output port, the controller being operable to:

generate a switching control signal for decoupling the rechargeable battery from the output of the battery charging circuit responsive to determining that the input voltage is present at the input port and at least one load device is coupled to the at least one output port; and after generating the switching control signal, generate a bypass control signal causing the bypass circuit to couple the input port to the voltage adjustment circuit.

21. A direct current (DC) power source comprising:

an input port operable to receive an input voltage;

a battery charging circuit coupled to the input port and including at least two outputs, the battery charging circuit being operable during normal operation to produce, at a first output, a battery charging voltage based on the input voltage and to produce, at a second output, an intermediate voltage that is over-voltage protected to be no greater than a first maximum voltage, the first maximum voltage being less than a second maximum voltage that can be applied to the input port;

a bypass circuit connected between the first output of the battery charging circuit and the second output of the battery charging circuit, the bypass circuit operable to selectively couple and decouple the first output of the battery charging circuit and the second output of the battery charging circuit responsive to bypass control signals;

a rechargeable battery;

a switching circuit configured to selectively couple and decouple the rechargeable battery and the output of the battery charging circuit responsive to switching control signals;

a voltage adjustment circuit coupled to the first output of the battery charging circuit and operable to adjust one of the battery charging voltage, an output voltage of the rechargeable battery, and an output voltage of the bypass circuit so as to be within a specified output voltage range to produce an adjusted voltage;

at least one output port coupled to an output of the voltage adjustment circuit, the at least one output port enabling at least one load device to be coupled to the DC power source; and a controller operably coupled to the input port, the switching circuit, the bypass circuit, the battery charging circuit, and the at least one output port, the controller being operable to:

generate a switching control signal for decoupling the rechargeable battery from the first output of the battery charging circuit responsive to determining that the input voltage is present at the input port and at least one load device is coupled to the at least one output port; and after the generating the switching control signal, generate a bypass control signal causing the bypass circuit to couple the second output of the battery charging circuit to the voltage adjustment circuit.

* * * * *